(12) United States Patent
Zhu et al.

(10) Patent No.: US 11,409,636 B2
(45) Date of Patent: Aug. 9, 2022

(54) PROCESSOR INCLUDING DEBUG UNIT AND DEBUG SYSTEM

(71) Applicant: ALIBABA GROUP HOLDING LIMITED, Grand Cayman (KY)

(72) Inventors: Taotao Zhu, Hangzhou (CN); Chen Chen, Shanghai (CN)

(73) Assignee: Alibaba Group Holding Limited, Grand Cayman (KY)

( * ) Notice: Subject to any disclaimer, the term of this patent is extended or adjusted under 35 U.S.C. 154(b) by 143 days.

(21) Appl. No.: 16/822,524

(22) Filed: Mar. 18, 2020

(65) Prior Publication Data
US 2020/0310944 A1 Oct. 1, 2020

(30) Foreign Application Priority Data

Mar. 25, 2019 (CN) .......................... 201910228610.X

(51) Int. Cl.
*G06F 9/30* (2018.01)
*G06F 11/36* (2006.01)
*G06F 9/32* (2018.01)

(52) U.S. Cl.
CPC ...... *G06F 11/3656* (2013.01); *G06F 9/30003* (2013.01); *G06F 9/30101* (2013.01); *G06F 9/322* (2013.01)

(58) Field of Classification Search
CPC .. G06F 9/30003; G06F 9/30101; G06F 9/322; G06F 9/3656
See application file for complete search history.

(56) References Cited

U.S. PATENT DOCUMENTS

| 5,805,844 A * | 9/1998 | Gustin | G06F 13/423 710/22 |
| 5,978,902 A * | 11/1999 | Mann | G06F 11/348 712/227 |
| 5,978,937 A * | 11/1999 | Miyamori | G06F 11/3656 714/45 |
| 2005/0114616 A1 | 5/2005 | Tune et al. | |
| 2013/0283017 A1 | 10/2013 | Wilkerson et al. | |

OTHER PUBLICATIONS

International Search Report and written opinion in related International Application No. PCT/US2020/023298, dated Jun. 18, 2020 (14 pgs).

* cited by examiner

*Primary Examiner* — Corey S Faherty
(74) *Attorney, Agent, or Firm* — Finnegan, Henderson, Farabow, Garrett & Dunner, LLP

(57) ABSTRACT

The present disclosure discloses a debug unit, comprising: a write register configured to store kernel write data written by a kernel of a processor, wherein the processor is communicatively coupled to a debugger configured to read the kernel write data, wherein the kernel write data is associated with a kernel write flag bit to indicate data validity of the kernel write data; and a control unit including circuitry configured to control access to the write register by the kernel of the processor and the debugger based on data validity indicated by the kernel write flag bit. The present disclosure further discloses a corresponding processor including the debug unit, a corresponding debugger communicatively coupled to the processor, and a corresponding debug system including the processor coupled to the debugger.

19 Claims, 3 Drawing Sheets

PROCESSOR INCLUDING DEBUG UNIT AND DEBUG SYSTEM

CROSS REFERENCE TO RELATED APPLICATION

This disclosure claims the benefits of priority to Chinese application number 201910228610.X, filed Mar. 25, 2019, which is incorporated herein by reference in its entirety.

BACKGROUND

A processor generally includes a debug function. Debugging not only can find defects in a processor design process, but also can help programmers to better analyze the robustness of codes executed in the processor, and improve performance of the codes. To debug the processor, a communication channel between the processor and a debugger may be established to facilitate data transmission for debugging. But communication between the processor and the debugger can be inefficient.

SUMMARY OF THE DISCLOSURE

Therefore, the present disclosure provides a new processor and a debug unit included in the processor to solve or at least mitigate at least one of the problems discussed herein.

The present disclosure provides a debug unit. The debug unit includes: a write register configured to store kernel write data written by a kernel of a processor, wherein the processor is communicatively coupled to a debugger configured to read the kernel write data, wherein the kernel write data is associated with a kernel write flag bit to indicate data validity of the kernel write data; and a control unit including circuitry configured to control access to the write register by the kernel of the processor and the debugger based on data validity indicated by the kernel write flag bit.

In some embodiments, the control unit of the debug unit further includes circuitry configured to allow the kernel of the processor to write the kernel write data into the write register when the kernel write flag bit indicates that the kernel write data is invalid; prevent the kernel of the processor from writing the kernel write data into the write register when the kernel write flag bit indicates that the kernel write data are valid; or set the kernel write flag bit to indicate that the kernel write data is valid after the kernel of the processor writes the kernel write data.

In some embodiments, the control unit of the debug unit further includes circuitry configured to indicate, when the debugger reads the kernel write data from the write register, data validity of the obtained kernel write data to the debugger based on the kernel write flag bit; and set the kernel write flag bit to indicate that the kernel write data is invalid, after the debugger reads the kernel write data.

In some embodiments, the debug unit according to the present disclosure further includes: a jump enable register including a write enable bit indicating whether to generate a write jump request. The control unit further includes circuitry configured to, when the write enable bit instructs to generate a write jump request, send a write jump request to the kernel of the processor after the debugger reads the kernel write data.

In some embodiments, the debug unit according to the present disclosure further includes: a jump information maintenance unit configured to store a processing program address and processor state information. The control unit further includes circuitry configured to store, before the kernel of the processor sends the write jump request, a first processing program address and a first processor state in the jump information maintenance unit, such that the kernel of the processor, when processing the write jump request, sets a processor state to be the first processor state and jumps to the first processing program address for execution, wherein the first processing program address and the first processor state are associated with processing the write jump request.

In some embodiments, the debug unit according to the present disclosure further includes: a read register configured to store kernel read data written by the debugger, wherein the kernel of processor is configured to read the kernel read data, wherein the kernel read data is associated with a kernel read flag bit to indicate data validity of the kernel read data, wherein the control unit further includes circuitry configured to control access to the read register by the kernel of the processor and the debugger based on data validity indicated by the kernel read flag bit.

In some embodiments, the control unit in the debug unit further includes circuitry configured to allow the debugger to write the kernel read data into the read register when the kernel read flag bit indicates that the kernel read data is invalid; prevent the debugger from writing the kernel read data into the read register when the kernel read flag bit indicates that kernel read the data is valid; or set the kernel read flag bit to indicate that the kernel read data is valid after the debugger writes the kernel read data.

In some embodiments, the control unit further includes circuitry configured to indicate, when the kernel of the processor reads the kernel read data from the read register, data validity of the obtained read kernel read data to the kernel of the processor based on the kernel read flag bit; and set the kernel read flag bit to indicate that the kernel read data is invalid after the kernel of the processor reads the kernel read data.

In some embodiments, in the debug unit according to the present disclosure, the jump enable register includes a read enable bit, the read enable bit indicating whether to generate a read jump request; and wherein the control unit further includes circuitry configured to, when the read enable bit instructs to generate the read jump request, send the read jump request to the kernel of the processor after the debugger writes the kernel read data.

In some embodiments, the control unit further includes circuitry configured to store, before the kernel of the processor sends the read jump request, a second processing program address and a second processor state in the jump information maintenance unit, such that the kernel of the processor, when processing the read jump request, sets the processor state as the second processor state and jumps to the second processing program address for execution, wherein the second processing program address and the second processor state are associated with processing the read jump request.

In some embodiments, the first processing program address includes an entry address of the first processing program, the first processing program including a program instructing the kernel of the processor to write processor write data into the debug unit; and the second processing program address includes an entry address of the second processing program, the second processing program including a program instructing the kernel of the processor to read the processor read data from the debug unit.

In some embodiments, the kernel write flag bit is contained in the write register, and the kernel read flag bit is contained in the read register.

According to another aspect of the present disclosure, a processor is provided. The processor includes: the above debug unit as disclosed herein; and a kernel of the processor, including a read-write unit and a jump processing unit, where the read-write unit is configured to write kernel write data into a write register of the debug unit and read kernel read data from a read register of the debug unit, and the jump processing unit is configured to process a jump request sent by the debug unit.

According to still another aspect of the present disclosure, a debugger is provided. The debugger includes: a debug host configured to generate a debug command to be sent to the processor according to the present disclosure, and present debug data sent by the processor in response to the debug command; and a protocol converter configured to convert the debug command, send the converted debug command to the processor, and receive debug data returned from the processor. The protocol converter is configured to write kernel read data related to the debug command to a read register of a debug unit in the processor, and read kernel write data from a write register of the debug unit for use as the debug data.

According to yet another aspect of the present disclosure, a debug system is provided. The debug system includes the processor coupled to the debugger as disclosed in the present disclosure.

According to the scheme of the present disclosure, a built-in debug unit in a processor is configured to process debug data communication between a kernel of the processor and an external debugger, and a control unit in the debug unit includes circuitry configured to control debug data transmission between the kernel of the processor and the debugger based on a kernel read flag bit of the processor and a kernel write flag bit of the processor, such that the kernel of the processor does not need to determine whether to perform the debug data transmission by querying a register, thereby improving the debugging efficiency.

In another aspect, according to the scheme of the present disclosure, when the debugger writes data to be sent to the kernel of the processor, debug jump requests may be generated immediately, such that the kernel of the processor reads the data, and completes a communication transmission from the debugger to the kernel of the processor with substantially reduced or minimum delay; and after the debugger reads the data transferred by the kernel of the processor, debug jump requests can also be generated immediately, such that the kernel of the processor re-writes new data, and starts next communication transmission from the kernel of the processor to the debugger with substantially reduced or minimum delay. The debug and jump scheme provided in the present scheme can be used without the need for informing the kernel of the processor to perform data transmission by interrupt and without the need for occupying resources of interrupt vector numbers, thus avoiding the problem of slow response caused by low interrupt priority.

BRIEF DESCRIPTION OF THE DRAWINGS

To achieve the above and related objects, some illustrative aspects are described herein in conjunction with the following descriptions and accompanying drawings. These aspects indicate various approaches by which the principles disclosed herein may be practiced, and all aspects and equivalent aspects thereof are intended to fall within the scope of the claimed subject matter. After reading detailed descriptions below with reference to the accompanying drawings, the above and other objectives, features, and advantages of the present disclosure may become more apparent. Throughout the present disclosure, identical reference numerals generally refer to identical components or elements.

DETAILED DESCRIPTION

Exemplary embodiments of the present disclosure will be described below in more detail with reference to the accompanying drawings. The exemplary embodiments of the present disclosure are shown in the accompanying drawings. However, it should be understood that the present disclosure can be implemented in various forms without being limited to the embodiments set forth herein. In contrast, these embodiments are provided to enable more thorough understanding of the present disclosure, and fully convey the scope of the present disclosure to those skilled in the art.

Debugging the processor may include various processes. For example, debugging may include obtaining a current state of the processor and content of a register and a memory in real time during execution, and modifying the content of the register and the memory and the state of the processor. Therefore, to debug the processor, a communication channel may be established between a kernel of the processor and a debugger to facilitate data transmission between the kernel of the processor and the debugger.

One of the existing schemes for establishing the communication channel may include causing the debugger to generate an interrupt to inform the kernel of the processor to perform the data transmission. The disadvantage of this approach is that it may occupy a separate interrupt vector number and also cause issues related to the priority of the interrupt. For example, if the system provides a low priority for the interrupt, the interrupt generated by the debugger may not be responded by the kernel of the processor for a very long time, thereby resulting in a problem of inefficient communication.

The embodiments of the present disclosure provide debugging techniques that allow for a more efficient way to establish a communication channel and perform transmission of debug data.

Figure 1:
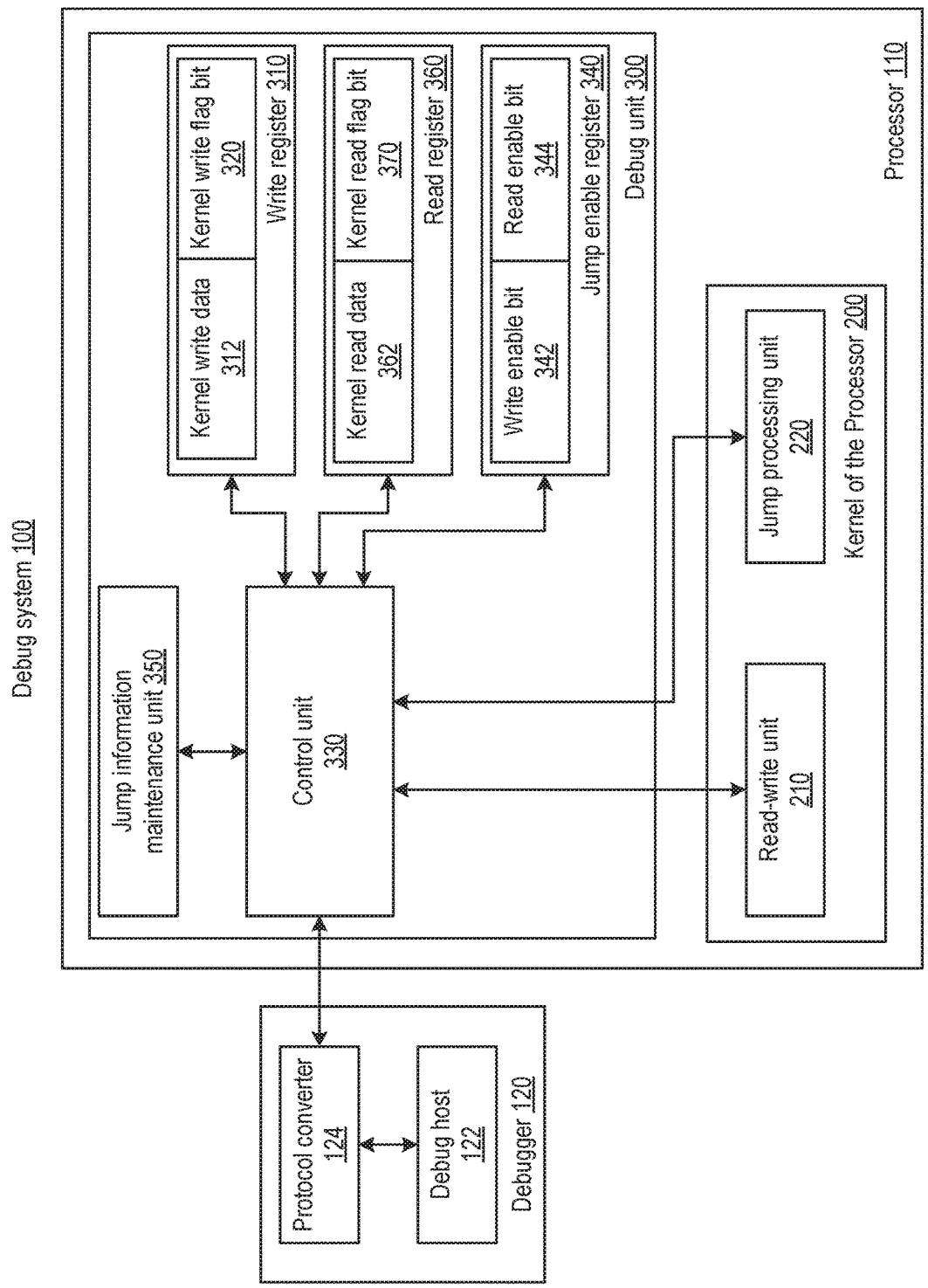
FIG. 1 shows a schematic diagram of a debug system according to some embodiments of the present disclosure.

FIG. 1 shows a schematic diagram of a debug system 100 according to some embodiments of the present disclosure. As shown in FIG. 1, debug system 100 includes a processor 110 and a debugger 120. Processor 110 includes a kernel 200 of the processor (e.g., also referred to as "kernel 200" herein) and a debug unit 300.

Debugger 120 is a device configured to debug processor 110. Processor 110 can communicate with debugger 120 through debug unit 300. In some embodiments, communication between debugger 120 and debug unit 300 may be performed via a JTAG (Joint Test Action Group) interface and based on a JTAG communication protocol compatible with IEEE-1149.1 standard. The present disclosure is not limited to a specific form of the JTAG interface for communication between debugger 120 and processor 110 (e.g., debug unit 300). The JTAG interface may be integrated with an existing JTAG component or a standalone JTAG controller. The present disclosure is not limited to the JTAG protocol. All approaches by which debug commands and data may be transmitted between debugger 120 and processor 110 fall within the scope of protection of the present disclosure.

In some embodiments, debugger 120 includes a debug host 122 and a protocol converter 124. Debug host 122 may be a computer running debug software, and may send some high-level debug commands, such as setting a breakpoint, accessing to a memory or register, and writing debug data to the memory or register. Debug host 122 may send these debug commands to protocol converter 124. Protocol converter 124 can convert the high-level debug commands to underlying JTAG commands, and then transmit the JTAG commands to debug unit 300 via the JTAG interface. Similarly, if debug unit 300 initiates data transmission to debugger 120, debug unit 300 sends a JTAG command to debugger 120 via the JTAG interface. Protocol converter 124 can receive the JTAG command, convert the JTAG command into a high-level command, and then send the high-level command to debug host 122 to present the received debug data on debug host 122.

Processor 110 can provide a debug function to debugger 120 coupled to processor 110 via debug unit 300. Data transmission between debugger 120 and kernel 200 may be included for debugging. In some embodiments, a debug communication channel between debugger 120 and kernel 200 may be established using debug unit 300 to achieve data transmission between debugger 120 and kernel 200. The debug communication may include two circumstances: one is kernel 200 transmitting data to debugger 120, and the other is debugger 120 transmitting data to kernel 200. Debug unit 300 can implement the debug communication in these two circumstances.

As shown in FIG. 1, debug unit 300 includes a write register 310. Write register 310 may be, for example, a 32-bit or 33-bit register. Write register 310 may store kernel write data 312 written by kernel 200. Kernel write data 312 can then be read by debugger 120, thereby achieving data transmission from kernel 200 to debugger 120.

Debug unit 300 further includes a kernel write flag bit 320. Kernel write flag bit 320 can be used to indicate data validity of kernel write data 312 in write register 310. For example, data of kernel write data 312 may be regarded as valid when kernel write data 312 are written into write register 310 by kernel 200 and have not been read by debugger 120. After debugger 120 has read kernel write data 312, kernel write flag bit 320 may indicate that data of kernel write data 312 is invalid (e.g., kernel 200 can write new data of kernel write data 312 into write register 310). In some embodiments, a value of 1 in kernel write flag bit 320 may indicate that kernel write data 312 is valid, while a value of 0 in kernel write flag bit 320 may indicate that kernel write data 312 is invalid.

In some embodiments, kernel write flag bit 320 may be contained in write register 310. In some other embodiments, kernel write flag bit 320 may be independent of write register 310, e.g., stored in a register other than write register 310.

In some embodiments, write register 310 may be a 32-bit register. Kernel write flag bit 320 may be contained in write register 310. For example, one bit (e.g., any bit in the register) of the register can be used as kernel write flag bit 320, and the other 31 bits can be used for storing kernel write data 312. In another example, write register 310 may be a 33-bit register, where one bit of the 33-bit register can be used as kernel write flag bit 320, and the other 32 bits can be used for storing kernel write data 312.

Having kernel write flag bit 320 contained in write register 310 can have at least an advantage that kernel write flag bit 320 and kernel write data 312 can be obtained simultaneously by reading write register 310. When kernel write flag bit 320 is stored independently of write register 310 (e.g., stored in a different register from write register 310), kernel write flag bit 320 may be read first, and then kernel write data 312 stored in write register 310 may be read based on the value of kernel write flag bit 320, and thus the number of times of reading the registers may be increased.

As shown in FIG. 1, debug unit 300 further includes a control unit 330. Control unit 330 may include circuitry configured to control access to write register 310 by kernel 200 and debugger 120, e.g., including writing kernel write data 312 and reading kernel write data 312. Control unit 330 may control access to write register 310 based on the value of kernel write flag bit 320, e.g., the data validity indicated by kernel write flag bit 320.

Kernel 200 can write kernel write data 312 into write register 310 via control unit 330. In some embodiments, as shown in FIG. 1, kernel 200 includes a read-write unit 210. Kernel 200 may send kernel write data 312 to debug unit 300 via read-write unit 210. When the value of kernel write flag bit 320 indicates that the data is valid (e.g., including a value of 1), it means that data (e.g., kernel write data 312) currently in kernel write register 310 has not been read by debugger 120, and therefore, control unit 330 may prevent kernel 200 (e.g., read-write unit 210) from writing kernel write data 312 into write register 310. When the value of kernel write flag bit 320 indicates that the data is invalid (e.g., including a value of 0), it means that the data (e.g., kernel write data 312) currently in kernel write register 310 has been read by debugger 120. As a result, control unit 330 can allow kernel 200 to write kernel write data 312 into write register 310. After kernel write data 312 is written into write register 310, kernel write flag bit 320 can be set to have a value indicating that the data are valid (e.g., including a value of 1), thus preventing kernel 200 from continuing writing kernel write data 312 into write register 310.

In some embodiments, kernel write flag bit 320 may be contained in write register 310. Accordingly, kernel write flag bit 320 (e.g., a value of 1, indicating that the data is valid) and kernel write data 312 can be written into write register 310 at the same time, without having to write kernel write data 312 and modify the value of kernel write flag bit 320 separately. Therefore, data processing and communication (e.g., including a data writing process) in debug system 100 can be more efficient.

Further, debugger 120 can read kernel write data 312 from write register 310 via control unit 330. In some embodiments, when debugger 120 reads kernel write data 312, control unit 330 indicates to debugger 120 the data validity of kernel write data 312 based on the value of kernel write flag bit 320. In some embodiments, control unit 330 may directly send the value of kernel write flag bit 320 to debugger 120, such that debugger 120 can perform subsequent processing based on the value of kernel write flag bit 320. For example, when the value of kernel write flag bit 320 indicates that data in kernel write data 312 is valid, debugger 120 may use kernel write data 312 obtained from write register 310 for subsequent processing. In another example, when the value of kernel write flag bit 320 indicates that the data in kernel write data 312 is invalid, indicating that kernel write data 312 has been read by debugger 120 previously, in response, debugger 120 may abandon kernel write data 312 obtained from write register 310 this time. After reading kernel write data 312 each time, debugger 120 can set kernel write flag bit 320 to have a value indicating that the data in kernel write data 312 is invalid (e.g., set the value to 0), to indicate that current kernel write data 312 have been read by debugger 120 and is no longer valid.

In some embodiments, when kernel write flag bit 320 is contained in write register 310, both the value of kernel write flag bit 320 and kernel write data 312 may be obtained simultaneously by reading the information in write register 310 once, without the need for reading kernel write data 312 and the value of kernel write flag bit 320 separately.

In some embodiments, after reading current kernel write data 312, debugger 120 may inform kernel 200, such that kernel 200 can perform subsequent processing, for example, writing new kernel write data 312 into write register 310. Accordingly, control unit 330 may send a write jump request to kernel 200 after debugger 120 reads current kernel write data 312. As shown in FIG. 1, kernel 200 includes a jump processing unit 220 configured to process the write jump request sent by debug unit 300 (e.g., sent by control unit 330). For example, when jump processing unit 220 receives the write jump request from control unit 330, indicating that current kernel write data 312 have been read by debugger 120, jump processing unit 220 may invoke a corresponding program to process the write jump request, including, for example, re-writing new kernel write data 312 into write register 310.

In some embodiments, as shown in FIG. 1, debug unit 300 further includes a jump enable register 340. Jump enable register 340 includes a write enable bit 342 (e.g., "W"). Write enable bit 342 can be used to represent an instruction (e.g., to control unit 330) about whether to generate a write jump request. In some embodiments, a value of 1 in write enable bit 342 may indicate an instruction to generate a write jump request, and a value of 0 in write enable bit 342 may indicate an instruction not to generate a write jump request. Control unit 330 may determine whether to send a write jump request based on the value of write enable bit 342. For example, when the value of write enable bit 342 indicates an instruction to generate a write jump request (e.g., the value of write enable bit 342 being 1), control unit 330 may send a write jump request to kernel 200 after debugger 120 reads the current kernel write data 312. In another example, when the value of write enable bit 342 indicates an instruction not to generate a write jump request (e.g., the value of write enable bit 342 being 0), control unit 330 may not send a write jump request after debugger 120 reads the current kernel write data 312.

In some embodiments, as shown in FIG. 1, debug unit 300 further includes a jump information maintenance unit 350. Jump information maintenance unit 350 may store a processing program address and processor state information. In some embodiments, control unit 330 may store an address of the write jump request processing program configured for processing a write jump request and a processor state in jump information maintenance unit 350 before sending the write jump request. When processing the write jump request, jump processing unit 220 may read the address of the write jump request processing program and the processor state stored in jump information maintenance unit 350, set the processor state as the obtained processor state, and jump to the address of the write jump request processing program to execute the write jump request processing program. In some embodiments, debugger 120 or kernel 200 may preset the address of the write jump request processing program and the processor state in debug unit 300 to flexibly control the write jump request processing. For example, the write jump request processing program may include instructions to instruct kernel 200 to write kernel write data 312 (e.g., new data of kernel write data 312), thus achieving continuous output of debug data by kernel 200 (e.g., to debugger 120).

As shown in FIG. 1, debug unit 300 may further include a read register 360. Kernel read register 360, for example, may be a 32-bit or 33-bit register, and may store kernel read data 362 written by debugger 120. Kernel read data 362 may be read by kernel 200, e.g., read-write unit 210, to achieve data transmission from debugger 120 to kernel 200.

Debug unit 300 may further include a kernel read flag bit 370. Kernel read flag bit 370 may be used to indicate data validity of kernel read data 362 in read register 370. For example, data of kernel read data 362 being valid may indicate that the data are written into read register 360 by debugger 120 and have not been read by kernel 200. If kernel 200 has read kernel read data 362, then kernel read flag bit 370 may include a value that indicates that the data of kernel read data 362 are invalid. In some embodiments, a value of 1 in kernel read flag bit 370 may indicate that kernel read data 362 is valid, while a value of 0 in kernel write flag bit 370 may indicate that kernel read data 362 is invalid.

In some embodiments, kernel read flag bit 370 may be contained in read register 360. In some embodiments, read register 360 is a 33-bit register, of which one bit (e.g., any bit in the register) can be used as kernel read flag bit 370, and the other 32 bits are used for storing kernel read data 362. In some other embodiments, read register 360 can be a 32-bit register or any other suitable type of register.

In some embodiments, kernel read flag bit 370 may also be independent of read register 360, e.g., in a register other than read register 360.

Kernel read flag bit 370 being contained in read register 360 has at least an advantage that kernel read flag bit 370 and kernel read data 362 may be obtained simultaneously from reading read register 360. For example, when kernel read flag bit 370 is independent of read register 360, kernel read flag bit 370 may first be read, and kernel read data 362 stored in read register 360 may then be read based on the value of kernel read flag bit 370. As such, the number of times of reading the registers may be increased.

Control unit 330 can control access to read register 360 by kernel 200 and debugger 120, e.g., including writing and reading kernel read data 362. Control unit 330 may control access to read register 360 based on the value in kernel read flag bit 370, e.g., the data validity indicated by the value.

Debugger 120 can write kernel read data 362 into read register 360 via control unit 330. In some embodiments, when the value of kernel read flag bit 370 indicates that kernel read data 362 is valid (e.g., with a value of 1), indicating that the data (e.g., kernel read data 362) currently in kernel read register 360 has not been read by kernel 200. Accordingly, control unit 330 prevents debugger 120 from writing kernel read data 362 into read register 360. In some other embodiments, when the value of kernel read flag bit 370 indicates that kernel read data 362 is invalid (e.g., with a value of 0), indicating that the data (e.g., kernel read data 362) currently in kernel read register 360 has been read by kernel 200. Accordingly, control unit 330 allows debugger 120 to write kernel read data 362 into read register 360. After kernel read data 362 is written into read register 360, kernel read flag bit 370 may be set to have a value indicating that the data are valid (e.g., a value of 1), thus preventing debugger 120 from continuing writing kernel read data 362 into read register 360.

In some embodiments, kernel read flag bit 370 may be contained in the read register 360. Accordingly, kernel read flag bit 370 (e.g., with a currently value of 1, indicating that the data is valid) and kernel read data 362 may be written into read register 360 at the same time, without having to write kernel read data 362 and modify the value of kernel read flag bit 370 separately.

In some embodiments, kernel 200 may read kernel read data 362 from debug unit 300 via read-write unit 210. Read-write unit 210 may read kernel read data 362 from read register 360 via control unit 330. When read-write unit 210 reads kernel read data 362, control unit 330 may indicates data validity of kernel read data 362 to read-write unit 210 based on the value of kernel read flag bit 370. In some embodiments, control unit 330 may directly send the value of kernel read flag bit 370 to read-write unit 210, such that read-write unit 210 performs subsequent processing based on the value. For example, when the value of kernel read flag bit 370 indicates that kernel read data 362 is valid, read-write unit 210 may use obtained kernel read data 362 for subsequent processing. In another example, and when the value of kernel read flag bit 370 indicates that kernel read data 362 is invalid, indicating that read-write unit 210 has read kernel read data 362 previously, and in response read-write unit 210 can abandon kernel read data 362. After reading kernel read data 362, read-write unit 210 may set kernel read flag bit 370 to have a value indicating that the data is invalid (e.g., set to 0), indicating that current kernel read data 362 have been read by read-write unit 210 and is no longer valid.

In some embodiments, when kernel read flag bit 370 is contained in write register 360, both the value of kernel read flag bit 370 and kernel read data 362 may be obtained at the same time by reading the information in read register 360 once, without having to read kernel read data 362 and the value of kernel read flag bit 370 separately.

In some embodiments, after writing new kernel read data 362 into read register 360, debugger 120 may inform kernel 200, such that kernel 200 can perform subsequent processing, such as reading the new written kernel read data 362. Accordingly, control unit 330 may send a read jump request to kernel 200 after debugger 120 writes the new kernel read data 362. When jump processing unit 220 in kernel 200 receives the read jump request from control unit 330, indicating that debugger 120 has written the new kernel read data 362, and in response, jump processing unit 200 may invoke a corresponding program to process the read jump request, for example, to read the new written kernel read data from read register 360.

In some embodiments, as shown in FIG. 1, jump enable register 340 includes a read enable bit 344 (e.g., marked as "R" in the following diagram). Read enable bit 344 can be used to store a value representing an instruction (e.g., to control unit 330) about whether to generate a read jump request. In some embodiments, a value of 1 in read enable bit 344 may indicate an instruction to generate a read jump request, whereas a value of 0 in read enable bit 344 may indicate an instruction not to generate a read jump request. Control unit 330 may determine whether to send a read jump request based on the value of read enable bit 344. For example, when the value of read enable bit 344 indicates an instruction to generate a read jump request (e.g., the value of read enable bit 344 being 1), control unit 330 may send a read jump request to kernel 200 after debugger 120 writes new kernel read data 362. In another example, when the value of read enable bit 344 indicates an instruction not to generate a read jump request (e.g., the value of read enable bit 344 being 0), control unit 330 may not send a read jump request after debugger 120 writes the new kernel read data 362.

In some embodiments, control unit 330 may store an address of a read jump request processing program configured for processing a read jump request and a processor state in jump information maintenance unit 350 before sending the read jump request. When processing the read jump request, jump processing unit 220 may read the address of the read jump request processing program and the processor state stored in jump information maintenance unit 350, set the processor state as the obtained processor state, and jump to the address of the read jump request processing program to execute the read jump request processing program. In some embodiments, debugger 120 or kernel 200 may preset the address of the read jump request processing program and the processor state in debug unit 300 to flexibly control the read jump request processing. For example, the read jump request processing program may include instructions to instruct kernel 200 to read kernel read data 362 (e.g., that has been written by debugger 120), thus achieving continuously writing debug data by debugger 120 (e.g., to processor 110).

Jump processing unit 220 may be configured to process a jump request sent by debug unit 300 (e.g., by control unit 330). In some embodiments, jump processing unit 220 may not distinguish between the read jump request and the write jump request. When receiving a jump request, jump processing unit 220 may store a current address (e.g., a value of a program counter (PC)) currently being executed by kernel 200, and stores a current state value of the processor. Then, jump processing unit 220 may read via control unit 330 the jump request processing program address and the processor state stored in jump information maintenance unit 350 before control unit 330 sends the jump request, set the processor state as the obtained processor state, and jump to a start position of the corresponding jump request processing program by setting the PC value as the address of the jump request processing program to execute the jump request processing program.

After execution of the jump request processing program has completed, jump processing unit 220 may read the address (e.g., the value of the PC) of the program that was being executed by kernel 200 and the processor state (e.g., at the moment of receiving the jump request and before processing the jump request by kernel 200). In some embodiments, such address information and the processor state information have been stored previously before the jump request is processed (e.g., after receiving the jump request but prior to processing the jump request by kernel 200). Jump processing unit 220 may further set the processor state as the obtained processor state, and set the PC value as the obtained program address obtained from reading to continue executing the program that was being executed by kernel 200 before processing the jump request.

In some embodiments, jump processing unit 220 may be adapted to store the current address of the program currently being executed by kernel 200 and the current processor state in jump information maintenance unit 350 of debug unit 300. Accordingly, when completing executing the corresponding request processing program, an address of a to-be-continued program (e.g., the program that was previously being executed) and a processor state (e.g., the previous processor state) may be acquired from jump information maintenance unit 350 (e.g., by kernel 200), and thus the execution of the program may be continued (e.g., resumed from where the processor left off to process the jump request).

In some embodiments, a special debug-jump completing instruction may be provided. By executing the special debug-jump completing instruction, the address of the to-be-continued program and the processor state may be acquired from jump information maintenance unit 350 via control unit 330, and the execution of the program from where it was left off may be continued. The debug-jump completing instruction may be executed when the execution of the request processing program is completed to continue executing the previous program.

In some embodiments, as described above, considering that a write jump request execution program may generally relate to a write operation by kernel 200 (e.g., by read-write unit 210) on write register 310, and a read jump request execution program may generally relate to a read operation by kernel 200 (e.g., by read-write unit 210) on read register 360 (e.g., resulting in changes of the value of kernel read flag bit 370 of the kernel of the processor), control unit 330 may monitor changes of values of the registers (e.g., write register 310 and read register 360) caused by operations of read-write unit 210. When the values of these registers are changed, control unit 330 may initiate a debug-jump returning operation to instruct jump processing unit 220 to acquire the address of the to-be-continued program (e.g., a program that was previously being executed by the processor prior to processing the read jump request or the write jump request) and the processor state (e.g., at the moment prior to processing the read jump request or the write jump request) from jump information maintenance unit 350. Control unit 330 may then set the processor state as the current processor state obtained from reading jump information maintenance 350, and jump to the address of the to-be-continued program to continue executing the to-be-continued program (e.g., to resume executing the program that was previously being executed by the processor).

In some embodiments, when debugger 120 writes data, which is to be transferred to kernel 200, to read register 360 via control unit 330, control unit 330 may immediately generate a read debug-jump request and send the read debug-jump request to kernel 200. Jump processing unit 220 in kernel 200 may interrupt a currently executed program and jump to a program for processing the read jump request, such that the program may instruct read-write unit 210 to read the data from read register 360, thereby completing communication from debugger 120 to kernel 200 (e.g., a reading operation by the processor to read data from debugger 120) with substantially reduced or minimum delay.

In some embodiments, after debugger 120 reads the data in write register 310 via control unit 330, which was transferred by kernel 200 (e.g., the data was written by kernel 200 into write register 310), control unit 330 may immediately generate a write debug-jump request and send the write debug-jump request to kernel 200. Jump processing unit 220 in kernel 200 may interrupt the currently executed program and jump to a program for processing the write jump request, such that the program may instruct read-write unit 210 to continue writing data (new data of kernel write data 312) into write register 310, thereby starting a next communication from kernel 200 to debugger 120 (e.g., a writing operation by the processor to write data to debugger 120) with substantially reduced or minimum delay.

Figure 2:
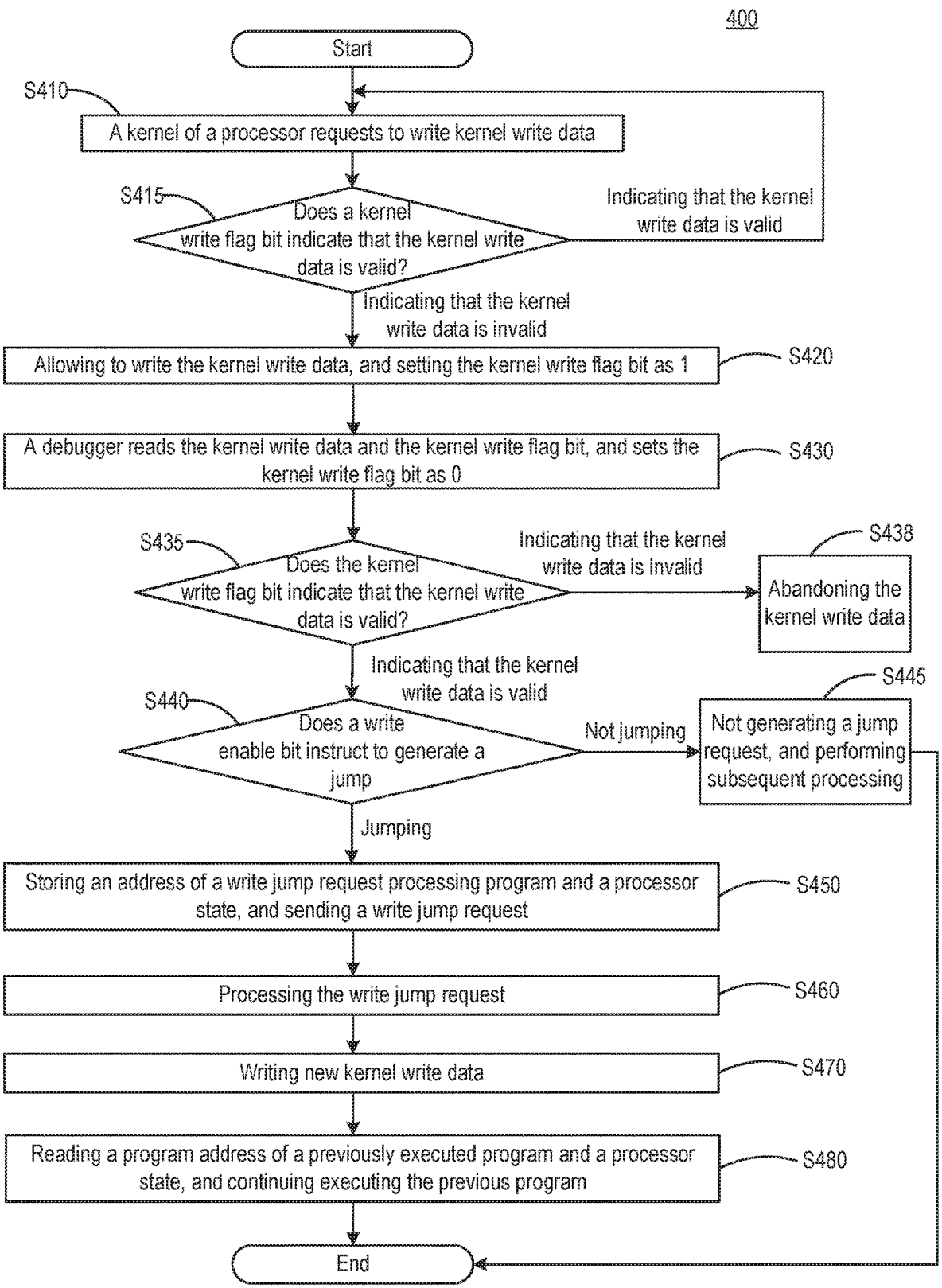
FIG. 2 shows a schematic flowchart of sending debug data from a kernel of a processor to a debugger according to some embodiments of the present disclosure.

FIG. 2 shows a schematic flowchart 400 of sending debug data from kernel 200 of the processor to debugger 120 (e.g., a write operation by the processor) according to some embodiments of the present disclosure. The debug data transmission process shown in FIG. 2 can be executed in debug system 100 shown in FIG. 1.

In step S410, read-write unit 210 in kernel 200 may request to write processor kernel write data 312 into write register 310 via control unit 330. In step S415, control unit 330 may determine, based on the value of kernel write flag bit 320 in write register 310, whether kernel write data 312 is valid. When kernel write data 312 is determined to be invalid (e.g., kernel write flag bit 320 including a value of 0), in step S420, control unit 330 may allow read-write unit 210 to write new data for processor kernel write data 312 into write register 310. In some embodiments, control unit 330 may further set kernel write flag bit 320 to indicate that kernel write data 312 is valid (e.g., set to have a value of 1).

In step S415, when kernel write data 312 is determined to be valid (e.g., kernel write flag bit 320 including a value of 1), read-write unit 210 may be prevented from writing data into write register 310. Accordingly, read-write unit 210 holds on and re-tries writing to write register 310 after kernel write data 312 has been read by debugger 120.

In step S430, debugger 120 may read processor kernel write data 312 and the value of kernel write flag bit 320 in write register 310 via control unit 330. Further, debugger 120, via control unit 330, may set kernel write flag bit 320 to have a value of 0 (e.g., indicating that current data in kernel write data 312 is invalid for future processes).

At step S435, debugger 120 may determine, based on the value of read kernel write flag bit 320 read from write register 310 at step S430 (e.g., read prior to setting kernel write flag bit to 0 at the end of step S430), whether kernel write data 312 read from write register 310 at step S430 is valid. In accordance with a determination that kernel write data 312 is invalid (e.g. kernel write flag bit 320 read at step S430 having a value of 0), in step S438, debugger 120 may abandon processor kernel write data 312 that was read from write register 310 in step S430. In accordance with a determination that kernel write data 312 is valid (e.g., kernel write flag bit 320 read at step S430 having a value of 1), debugger 120 may record the valid kernel write data 312. Further, when kernel write data 312 is determined to be valid, in step S440, control unit 330 may determine, based on the value of write enable bit 342 in jump enable register 340, whether the value in write enable bit 342 indicates an instruction to generate a write jump request. In accordance with a determination that write enable bit 342 has a value (e.g., a value of 0) indicating not to generate a write jump request, in step S445, control unit 330 may not generate a write jump request. Further, at step S445, debugger 120 may use processor kernel write data 312 obtained from reading write register 310 at step S430 for subsequent processing. In accordance with a determination, at step S440, that write enable bit 342 has a value (e.g., a value of 1) indicating an instruction to generate a write jump request, in step S450, control unit 330 may generate a write jump request. Control unit 330 may also store a program address of a program configured for processing the write jump request and corresponding processor state information in jump information maintenance unit 350. Control unit 330 may further send the generated write jump request to kernel 200.

In step S460, jump processing unit 220 in kernel 200 may process the write jump request received from control unit 330. In some embodiments, jump processing unit 220 may store an address of a program currently being executed by the processor and a current processor state in jump information maintenance unit 350 via control unit 330. In step S460, jump processing unit 220 may read the address of the program configured for processing the write jump request and the processor state information from jump information maintenance unit 350 via control unit 330 (e.g., previously stored by control unit 330 in step S450). Jump processing unit 220 may further set the processor state as the processor state that is read from jump information maintenance unit 350, and set a PC value as the program address of the program configured for processing the write jump request that is obtained from jump information maintenance unit 350. Accordingly, processor 110 can jump to the program configured for processing the write jump request to start execution of the program.

In step S470, by executing the program configured for processing the write jump request, read-write unit 210 may be instructed to write new data into the write register 310 (e.g., to kernel write data 312). In some embodiments, the process in step S470 may be substantially similar to the processes of steps S410 to S420. For the sake of brevity, the description may not be repeated.

After completing the execution of the write jump request processing program, in step S480, jump processing unit 220 may read the program address of the previously executed program and the corresponding processor state from jump information maintenance unit 350 (e.g., as stored at step S460). Jump processing unit 220 may set the processor state as the obtained processor state from reading jump information maintenance unit 350 in this step, and set the PC value as the obtained program address from reading jump information maintenance unit 350 in this step to resume executing the previous program (e.g., that was being executed by processor 110 prior to processing the write jump request at step S460).

By performing processing flow 400 shown in FIG. 2, data transmission from kernel 200 to debugger 120 can be completed more efficiently at once (e.g., within one process or one cycle), and data to be read (e.g., by debugger 120) in the next process (e.g., next cycle) can be well prepared for debugger 120. It is appreciated that one or more steps disclosed in processing flow 400 may be performed independently from other steps. That is, fewer than all steps may be performed without performing the other steps in processing flow 400. Further, multiple actions within one step of process 400 as illustrated in FIG. 2 may be performed independently from each other. That is, one or more actions illustrated within one step of process 400 can be optional.

Figure 3:
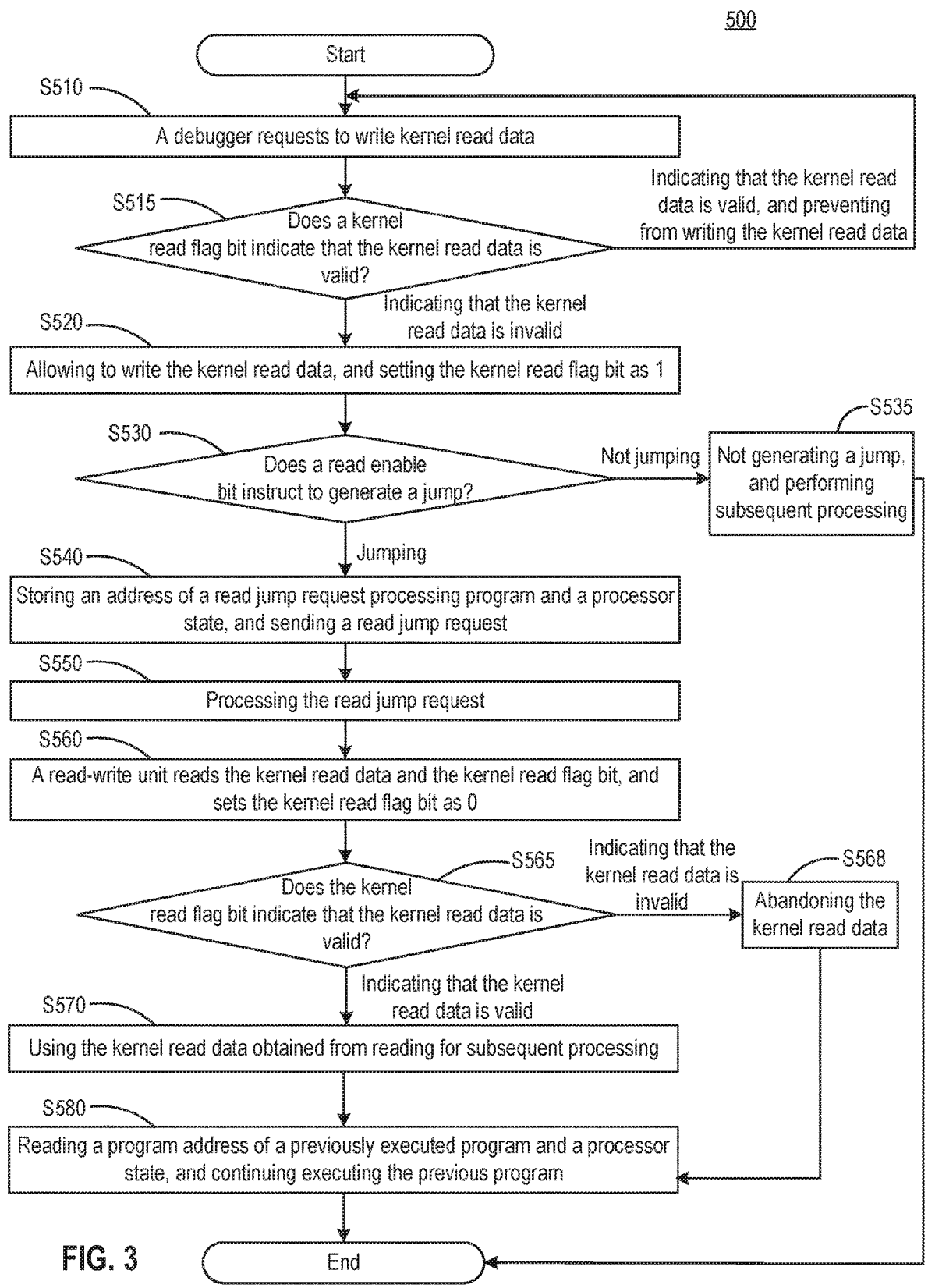
FIG. 3 shows a schematic flowchart of sending debug data from a debugger to a kernel of a processor according to some embodiments of the present disclosure.

FIG. 3 shows a schematic flowchart 500 of sending debug data from debugger 120 to kernel 200 (e.g., a read operation by the processor) according to some embodiments of the present disclosure. The debug data transmission process shown in FIG. 3 can be executed in debug system 100 shown in FIG. 1.

In step S510, debugger 120 may request to write processor kernel read data 362 into read register 360 via control unit 330. In step S515, control unit 330 may determine, based on the value of kernel read flag bit 370 in read register 360, whether processor kernel read data 362 is valid. When processor kernel read data 362 is determined to be invalid (e.g., kernel read flag bit 370 has a value of 0), in step S520, control unit 330 may allow debugger 120 to write new data for processor kernel read data 362 into read register 360. In some embodiments, control unit 330 may further set kernel read flag bit 370 to indicate that processor kernel read data 362 is valid (e.g., set to have a value of 1).

In step S515, when processor kernel read data 362 is determined to be valid (e.g., kernel read flag bit 370 has a value of 1), debugger 120 may be prevented from writing the data into read register 360. Accordingly, debugger 120 holds on writing data into read register 360, and re-tries writing after processor kernel read data 362 has been read by read-write unit 210 of kernel 200.

In step S530, control unit 330 may determine, based on the value of read enable bit 344 in jump enable register 340, whether the value in read enable bit 344 indicates an instruction to generate a read jump request. In accordance with a determination that read enable bit 344 has a value (e.g., a value of 0) indicating not to generate a read jump request, in step S535, control unit 330 may not generate a read jump request. Further, at step S535, subsequent processing may be performed, or processing flow may be terminated. In accordance with a determination that read enable bit 344 has a value (e.g., a value of 1) indicating an instruction to generate a read jump request, in step S540, control unit 330 may generate a read jump request. Control unit 330 may also store a program address of a program configured for processing the read jump request and corresponding processor state information in jump information maintenance unit 350. Control unit 330 may further send the generated read jump request to kernel 200.

In step S550, jump processing unit 220 in kernel 200 may process the read jump request received from control unit 330. In some embodiments, jump processing unit 220 may store an address of a program currently being executed by the processor and a current processor state in jump information maintenance unit 350 via control unit 330. In step S550, jump processing unit 220 may read the address of the program configured for processing the read jump request and the processor state information from jump information maintenance unit 350 via control unit 330 (e.g., previously stored by control unit 330 at step S530). Jump processing unit 220 may further set the processor state as the processor state that is read from maintenance unit 350, and set a PC value as the program address of the program configured for processing the read jump request that is obtained from jump information maintenance unit 350. Accordingly, processor 110 can jump to the program configured for processing the read jump request to start execution of the program.

In step S560, by executing the read jump request processing program, read-write unit 210 may be instructed to read processor kernel read data 362 and the value of kernel read flag bit 370 from read register 360 via control unit 330. In some embodiments, read-write unit 210, via control unit 330, may also set kernel read flag bit 370 to have a value indicating that processor kernel read data 362 is invalid for future processes (e.g., setting kernel read flag bit 370 to have a value of 0).

In step S565, read-write unit 210 may determine, based on the value of kernel read flag bit 370 read from read register 360 at step S560 (e.g., prior to setting kernel read flag bit 370 to 0 at the end of step S560), whether processor kernel read data 362 is valid. In accordance with a determination that kernel read flag bit 370 has a value of 0, in step S568, read-write unit 210 may abandon processor kernel read data 362 obtained from read register 360 in step S560. In accordance with a determination that kernel read flag bit 370 has a value of 1, in step S570, read-write unit 210 may use processor kernel read data 362 obtained from read register 360 for subsequent processing.

After completing executing the read jump request processing program, in step S580, jump processing unit 220 may read the program address of the previously executed program and the corresponding processor state from jump information maintenance unit 350 (e.g., stored in step S550). Jump processing unit 220 may set the processor state as the obtained processor state from reading jump information maintenance unit 350 in this step, and set the PC value as the obtained program address from reading jump information maintenance unit 350 in this step to resume executing the previous program (e.g., that was being executed by processor 110 prior to processing the read jump request at step S550).

By performing processing flow 500 shown in FIG. 3, debug data transmission from debugger 120 to kernel 200 can be completed more efficiently at once (e.g., within one process or one cycle). It is appreciated that one or more steps disclosed in processing flow 500 may be performed independently from other steps. That is, fewer than all steps may be performed without performing the other steps in processing flow 500. Further, multiple actions within one step of process 500 as illustrated in FIG. 3 may be performed independently from each other. That is, one or more actions illustrated within one step of process 500 can be optional.

The debug-jump scheme provided in the present disclosure can be used without informing kernel 200 to perform data transmission by creating any interrupt and without occupying resources of interrupt vector numbers, thus avoiding the problem of slow responses caused by low interrupt priority.

The embodiments may further be described using the following clauses:

1. A debug unit comprising:
   a write register configured to store kernel write data written by a kernel of a processor, wherein the processor is communicatively coupled to a debugger configured to read the kernel write data, wherein the kernel write data is associated with a kernel write flag bit to indicate data validity of the kernel write data; and
   a control unit including circuitry configured to control access to the write register by the kernel of the processor and the debugger based on data validity indicated by the kernel write flag bit.
2. The debug unit according to clause 1, wherein the control unit further includes circuitry configured to:
   allow the kernel of the processor to write the kernel write data into the write register when the kernel write flag bit indicates that the kernel write data is invalid;
   prevent the kernel of the processor from writing the kernel write data into the write register when the kernel write flag bit indicates that the kernel write data is valid; or
   set the kernel write flag bit to indicate that the kernel write data is valid after the kernel of the processor writes the kernel write data.
3. The debug unit according to any of clauses 1-2, wherein the control unit further includes circuitry configured to:
   indicate, when the debugger reads the kernel write data from the write register, data validity of the obtained kernel write data to the debugger based on the kernel write flag bit; and
   set the kernel write flag bit to indicate that the kernel write data is invalid after the debugger reads the kernel write data.
4. The debug unit according to any of clauses 1-3, further comprising:
   a jump enable register comprising a write enable bit indicating whether to generate a write jump request,
   wherein the control unit further includes circuitry configured to, when the write enable bit instructs to generate the write jump request, send the write jump request to the kernel of the processor after the debugger reads the kernel write data.
5. The debug unit according to clause 4, further comprising:
   a jump information maintenance unit configured to store a processing program address and processor state information,
   wherein the control unit further includes circuitry configured to store, before the kernel of the processor sends the write jump request, a first processing program address and a first processor state in the jump information maintenance unit, such that the kernel of the processor, when processing the write jump request, sets the processor state to be the first processor state and jumps to the first processing program address for execution, wherein the first processing program address and the first processor state are associated with processing the write jump request.
6. The debug unit according to any of clauses 1-5, further comprising:
   a read register configured to store kernel read data written by the debugger, wherein the kernel of the processor is configured to read the kernel read data, wherein the kernel read data is associated with a kernel read flag bit to indicate data validity of the kernel read data,
   wherein the control unit further includes circuitry configured to control access to the read register by the kernel of the processor and the debugger based on data validity indicated by the kernel read flag bit.
7. The debug unit according to clause 6, wherein the control unit further includes circuitry configured to:
   allow the debugger to write the kernel read data into the read register when the kernel read flag bit indicates that the kernel read data is invalid;
   prevent the debugger from writing the kernel read data into the read register when the kernel read flag bit indicates that the kernel read data is valid; or
   set the kernel read flag bit to indicate that the kernel read data is valid after the debugger writes the kernel read data.
8. The debug unit according to any of clauses 6-7, wherein the control unit further includes circuitry configured to:
   indicate, when the kernel of the processor reads the kernel read data from the read register, data validity of the obtained kernel read data to the kernel of the processor based on the kernel read flag bit; and
   set the kernel read flag bit to indicate that the kernel read data is invalid after the kernel of the processor reads the kernel read data.
9. The debug unit according to any of clauses 6-8, further comprising a jump enable register comprising a read enable bit, the read enable bit indicating whether to generate a read jump request; and
   wherein the control unit further includes circuitry configured to, when the read enable bit instructs to generate the read jump request, send the read jump request to the kernel of the processor after the debugger writes the kernel read data.
10. The debug unit according to clause 9, wherein the control unit further includes circuitry configured to store, before the kernel of the processor sends the read jump request, a second processing program address and a second processor state in the jump information maintenance unit, such that the kernel of the processor, when processing the read jump request, sets the processor state as the second processor state and jumps to the second processing program address for execution, wherein the second processing program address and the second processor state are associated with processing the read jump request.

11. The debug unit according to any of clauses 5-10, wherein the first processing program address comprises an entry address of the first processing program, the first processing program comprising a program instructing the kernel of the processor to write processor write data into the debug unit; and 12. The debug unit according to any of clauses 5-11, wherein the second processing program address comprises an entry address of the second processing program, the second processing program comprising a program instructing the kernel of the processor to read the processor read data from the debug unit.

13. The debug unit according to any of clauses 1-12, wherein the kernel write flag bit is contained in the write register, and the kernel read flag bit is contained in the read register.

14. A processor, comprising:
a debug unit comprising:
    a write register configured to store kernel write data written by a kernel of the processor, wherein the processor is communicatively coupled to a debugger configured to read the kernel write data, wherein the kernel write data is associated with a kernel write flag bit to indicate data validity of the kernel write data; and
    a control unit configured to control access to the write register by the kernel of the processor and the debugger based on data validity indicated by the kernel write flag bit; and
the kernel of the processor, comprising:
    a read-write unit configured to write the kernel write data into the write register of the debug unit via the control unit.

15. The processor according to clause 14, wherein the debug unit further comprises:
a read register configured to store kernel read data written by the debugger, wherein the kernel of the processor is configured to read the kernel read data, wherein the kernel read data is associated with a kernel read flag bit to indicate data validity of the kernel read data,
wherein the control unit further includes circuitry configured to control access to the read register by the kernel of the processor and the debugger based on data validity indicated by the kernel read flag bit, and
wherein the read-write unit is further configured to read the kernel read data from the read register of the debug unit via the control unit.

16. The processor according to any of clauses 14-15, wherein the kernel of the processor further comprises a jump processing unit configured to process a jump request sent by the debug unit, and wherein processing the jump request comprises:
storing a current processing program address and a current processor state;
setting a processor state as a first processor state stored in a jump information maintenance unit of the debug unit; and
jumping to a first jump processing program address stored in the jump information maintenance unit of the debug unit for execution,
wherein the first processor state and the first jump processing program address are associated with processing the jump request.

17. The processor according to any of clauses 14-16, wherein the jump processing unit is configured to store the current processing program address and the current processor state in the jump information maintenance unit of the debug unit.

18. The processor according to any of clauses 14-17, wherein the jump processing unit is configured to, when completing executing the jump processing program:
set the processor state as the stored current processor state; and
jump to the stored current processing program address to continue executing a current processing program.

19. The processor according to any of clauses 14-18, wherein the jump processing unit is configured to, when completing executing the jump processing program:
execute a debug-jump completing instruction to set the processor state as the stored current processor state; and
jump to the stored current processing program address to continue executing the current processing program.

20. The processor according to any of clauses 14-19, wherein the jump processing program comprises:
    a program instructing the kernel of the processor to write the processor write data into the debug unit; or
    a program instructing the kernel of the processor to read the processor read data from the debug unit, and
wherein the control unit of the debug unit is configured to, after detecting a read/write operation of the jump processing program on the debug unit:
    instruct the jump processing unit to set the processor state as the stored current processor state; and
    jump to the stored current processing program address to continue executing the current processing program.

21. A debugger, comprising:
a debug host configured to generate a debug command to be sent to a processor, and present debug data sent by the processor in response to the debug command; and
a protocol converter configured to convert the debug command, send the converted debug command to the processor, and receive debug data returned from the processor;
wherein the protocol converter is configured to write kernel read data related to the debug command to a read register of a debug unit in the processor, and read kernel write data from a write register of the debug unit for use as the debug data.

As used herein, unless specifically stated otherwise, the term "or" encompasses all possible combinations, except where infeasible. For example, if it is stated that a database may include A or B, then, unless specifically stated otherwise or infeasible, the database may include A, or B, or A and B. As a second example, if it is stated that a database may include A, B, or C, then, unless specifically stated otherwise or infeasible, the database may include A, or B, or C, or A and B, or A and C, or B and C, or A and B and C.

It should be understood that, in the above description of exemplary embodiments of the present disclosure, various features are grouped together in a single embodiment, figure, flowchart, or description thereof, for the purpose of streamlining the present disclosure and aiding in the understanding of one or more of various inventive aspects. However, the disclosed method should not be interpreted as reflecting an intention that the claimed disclosure requires more features than are explicitly recited in each claim. Rather, as the following claims reflect, inventive aspects lie in fewer than all features of the foregoing disclosed single embodiment. Thus, the claims following a specific implementation manner are explicitly incorporated into the specific implementation manner, with each claim standing on its own as separate embodiments of the present disclosure.

Those skilled in the art should understand that modules or units or components of a device in an example disclosed herein may be arranged in the device described in the embodiments or may be alternatively positioned in one or more devices different from the device in the example. The modules in the foregoing examples may be combined into one module or be additionally divided into a plurality of sub-modules.

Those skilled in the art should understand that the modules in the device of embodiments may be adaptively modified and provided in one or more devices different from the device in the embodiment. The modules or units or components in some embodiments may be combined into one module or unit or component, and additionally be divided into a plurality of sub-modules or sub-units or sub-components. All features disclosed in the present specification (including the appended claims, abstract, and accompanying drawings) and all the processes or units of any method or device thus disclosed may be combined in any combination, except combinations where at least some of such features or processes or units are mutually exclusive. Each feature disclosed in the present specification (including the appended claims, abstract, and accompanying drawings) can be replaced by alternative features serving the same, equivalent or similar purpose, unless expressly stated otherwise.

Furthermore, while some embodiments described herein include some but not other features included in other embodiments, combinations of features of different embodiments are meant to be within the scope of the present disclosure and form different embodiments, as would be understood by those skilled in the art. For example, in the following claims, any of the claimed embodiments can be used in any combination.

Furthermore, some of the embodiments are described herein as a method or combination of elements of a method that can be implemented by a processor of a computer system or by other system carrying out the function. Thus, a processor with the necessary instructions for carrying out such a method or element of a method forms a process for carrying out the method or element of a method. Furthermore, an element of an apparatus described in the embodiments is an example of carrying out the function performed by the element for the purpose of carrying out the disclosure.

As used herein, unless otherwise specified, the use of the ordinal adjectives "first," "second," and "third," etc., to describe a common object merely indicates that different instances of like objects are being referred to, and is not intended to imply that the objects so described must be in a given sequence, either temporally, spatially, in ranking or in any other manner.

While the present disclosure has been described with respect to a limited number of embodiments, those skilled in the technical field will appreciate that other embodiments may be conceived within the scope of the present disclosure described herein based on the above description. In addition, it should be noted that the language used in the specification has been principally selected for readability and instructional purposes and not for delineating or limiting the inventive subject matter. Accordingly, numerous modifications and alterations are apparent to those of ordinary skills in the technical field without departing from the scope and spirit of the appended claims. The disclosure of the present disclosure is intended to be illustrative, but not limiting, of the scope of the present disclosure, which is defined by the appended claims.

The invention claimed is:

1. A debug unit, comprising:
   a write register configured to store kernel write data written by a kernel of a processor, wherein the processor is communicatively coupled to a debugger configured to read the kernel write data, wherein the kernel write data is associated with a kernel write flag bit to indicate data validity of the kernel write data;
   a jump enable register comprising a write enable bit indicating whether to generate a write jump request; and
   a control unit including circuitry configured to:
      control access to the write register by the kernel of the processor and the debugger based on data validity indicated by the kernel write flag bit; and
      send the write jump request to the kernel of the processor after the debugger reads the kernel write data and when the write enable bit instructs to generate the write jump request.

2. The debug unit according to claim 1, wherein the control unit further includes circuitry configured to:
   allow the kernel of the processor to write the kernel write data into the write register when the kernel write flag bit indicates that the kernel write data is invalid;
   prevent the kernel of the processor from writing the kernel write data into the write register when the kernel write flag bit indicates that the kernel write data is valid; or
   set the kernel write flag bit to indicate that the kernel write data is valid after the kernel of the processor writes the kernel write data.

3. The debug unit according to claim 1, wherein the control unit further includes circuitry configured to:
   indicate, when the debugger reads the kernel write data from the write register, data validity of the obtained kernel write data to the debugger based on the kernel write flag bit; and
   set the kernel write flag bit to indicate that the kernel write data is invalid after the debugger reads the kernel write data.

4. The debug unit according to claim 1, further comprising:
   a jump information maintenance unit configured to store a processing program address and processor state information,
   wherein the control unit further includes circuitry configured to store, before the kernel of the processor sends the write jump request, a first processing program address and a first processor state in the jump information maintenance unit, such that the kernel of the processor, when processing the write jump request, sets a processor state to be the first processor state and jumps to the first processing program address for execution, wherein the first processing program address and the first processor state are associated with processing the write jump request.

5. The debug unit according to claim 1, further comprising:
   a read register configured to store kernel read data written by the debugger, wherein the kernel of the processor is configured to read the kernel read data, wherein the kernel read data is associated with a kernel read flag bit to indicate data validity of the kernel read data,
   wherein the control unit further includes circuitry configured to control access to the read register by the kernel of the processor and the debugger based on data validity indicated by the kernel read flag bit.

6. The debug unit according to claim 5, wherein the control unit further includes circuitry configured to:
allow the debugger to write the kernel read data into the read register when the kernel read flag bit indicates that the kernel read data is invalid;
prevent the debugger from writing the kernel read data into the read register when the kernel read flag bit indicates that the kernel read data is valid; or
set the kernel read flag bit to indicate that the kernel read data is valid after the debugger writes the kernel read data.

7. The debug unit according to claim 5, wherein the control unit further includes circuitry configured to:
indicate, when the kernel of the processor reads the kernel read data from the read register, data validity of the obtained kernel read data to the kernel of the processor based on the kernel read flag bit; and
set the kernel read flag bit to indicate that the kernel read data is invalid after the kernel of the processor reads the kernel read data.

8. The debug unit according to claim 5, further comprising a jump enable register comprising a read enable bit, the read enable bit indicating whether to generate a read jump request; and
wherein the control unit further includes circuitry configured to, when the read enable bit instructs to generate the read jump request, send the read jump request to the kernel of the processor after the debugger writes the kernel read data.

9. The debug unit according to claim 8, wherein the control unit further includes circuitry configured to store, before the kernel of the processor sends the read jump request, a second processing program address and a second processor state in the jump information maintenance unit, such that the kernel of the processor, when processing the read jump request, sets the processor state as the second processor state and jumps to the second processing program address for execution, wherein the second processing program address and the second processor state are associated with processing the read jump request.

10. The debug unit according to claim 4, wherein the first processing program address comprises an entry address of the first processing program, the first processing program comprising a program instructing the kernel of the processor to write processor write data into the debug unit.

11. The debug unit according to claim 10, wherein the second processing program address comprises an entry address of the second processing program, the second processing program comprising a program instructing the kernel of the processor to read the processor read data from the debug unit.

12. The debug unit according to claim 5, wherein the kernel write flag bit is contained in the write register, and the kernel read flag bit is contained in the read register.

13. A processor, comprising:
a debug unit comprising:
a write register configured to store kernel write data written by a kernel of the processor, wherein the processor is communicatively coupled to a debugger configured to read the kernel write data, wherein the kernel write data is associated with a kernel write flag bit to indicate data validity of the kernel write data;
a jump enable register comprising a write enable bit indicating whether to generate a write jump request; and
a control unit including circuitry configured to:
control access to the write register by the kernel of the processor and the debugger based on data validity indicated by the kernel write flag bit; and
send the write jump request to the kernel of the processor after the debugger reads the kernel write data and when the write enable bit instructs to generate the write jump request; and
the kernel of the processor comprising:
a read-write unit configured to write the kernel write data into the write register of the debug unit via the control unit.

14. The processor according to claim 13, wherein the debug unit further comprises:
a read register configured to store kernel read data written by the debugger, wherein the kernel of the processor is configured to read the kernel read data, wherein the kernel read data is associated with a kernel read flag bit to indicate data validity of the kernel read data,
wherein the control unit further includes circuitry configured to control access to the read register by the kernel of the processor and the debugger based on data validity indicated by the kernel read flag bit, and
wherein the read-write unit is further configured to read the kernel read data from the read register of the debug unit via the control unit.

15. The processor according to claim 14, wherein the kernel of the processor further comprises a jump processing unit configured to process the jump request sent by the debug unit, and wherein processing the jump request comprises:
storing a current processing program address and a current processor state;
setting a processor state as a first processor state stored in a jump information maintenance unit of the debug unit; and
jumping to a first jump processing program address stored in the jump information maintenance unit of the debug unit for execution,
wherein the first processor state and the first jump processing program address are associated with processing the jump request.

16. The processor according to claim 15, wherein the jump processing unit is configured to store the current processing program address and the current processor state in the jump information maintenance unit of the debug unit.

17. The processor according to claim 15, wherein the jump processing unit is configured to, when completing executing the jump processing program:
set the processor state as the stored current processor state; and
jump to the stored current processing program address to continue executing a current processing program.

18. The processor according to claim 17, wherein the jump processing unit is configured to, when completing executing the jump processing program:
execute a debug-jump completing instruction to set the processor state as the stored current processor state; and
jump to the stored current processing program address to continue executing the current processing program.

19. The processor according to claim 17, wherein the jump processing program comprises:
a program instructing the kernel of the processor to write the processor write data into the debug unit; or a program instructing the kernel of the processor to read the processor read data from the debug unit, and wherein the control unit of the debug unit is configured to, after detecting a read/write operation of the jump processing program on the debug unit:
  instruct the jump processing unit to set the processor state as the stored current processor state; and
  jump to the stored current processing program address to continue executing the current processing program.

* * * * *